June 7, 1927.
T. A. BANNING JR
1,631,356
FUEL FEEDING AND METERING SYSTEM AND APPARATUS
Filed July 25, 1924     3 Sheets-Sheet 1
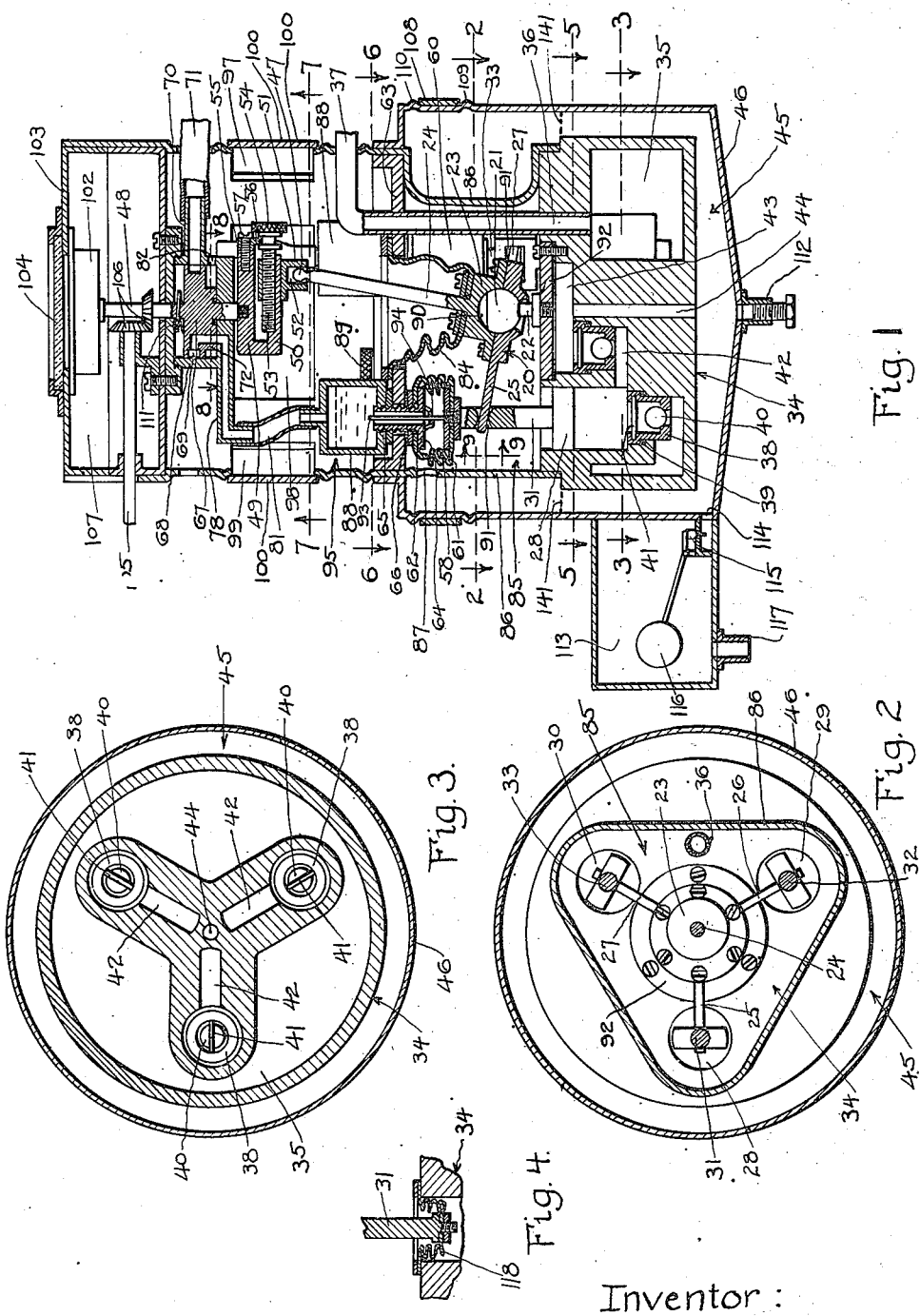
Inventor:
Thomas A. Banning, Jr.
by
Attys.

June 7, 1927. 1,631,356
T. A. BANNING JR
FUEL FEEDING AND METERING SYSTEM AND APPARATUS
Filed July 25, 1924   3 Sheets-Sheet 2
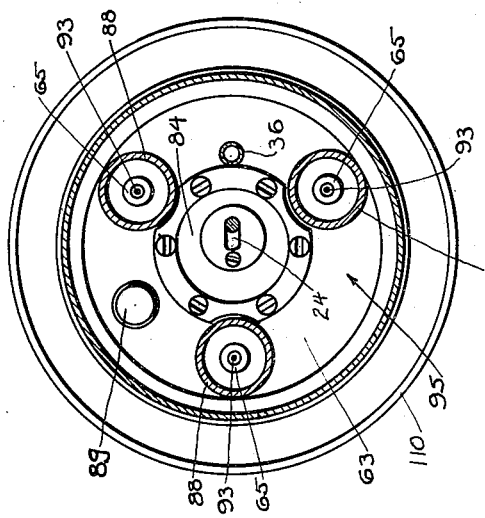
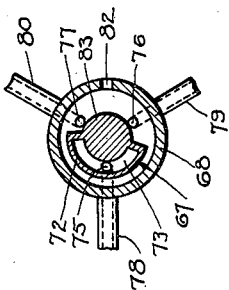
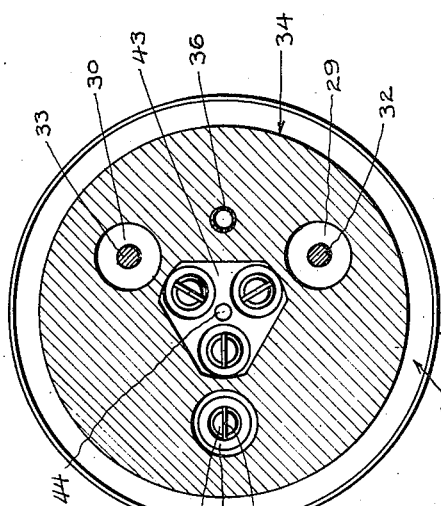
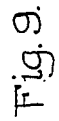
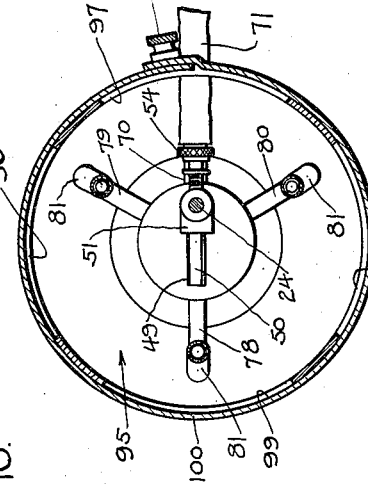
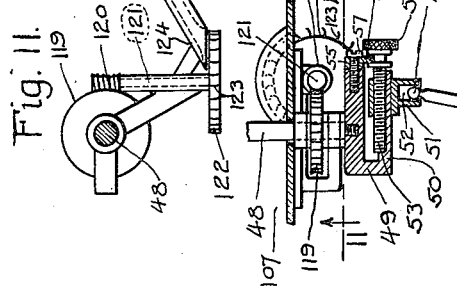
Inventor:
Thomas A. Banning, Jr.
by
Attys.

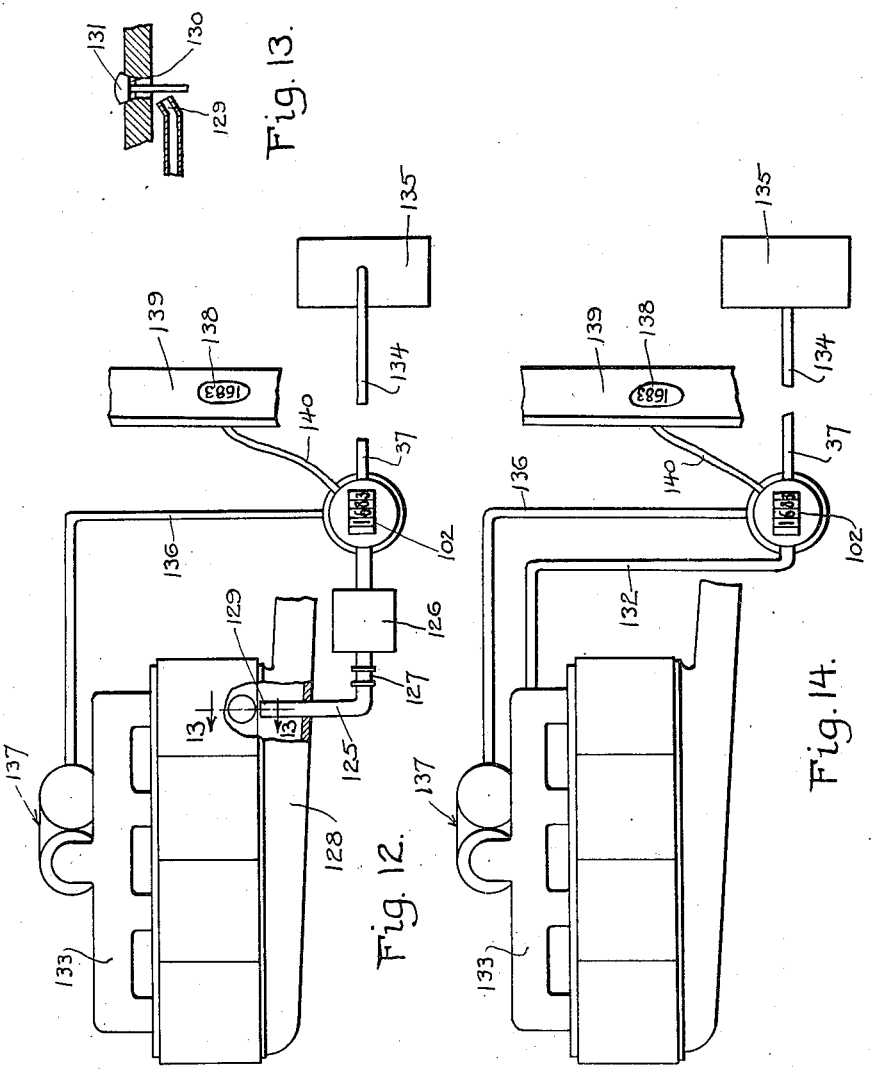

Patented June 7, 1927.

1,631,356

UNITED STATES PATENT OFFICE.

THOMAS A. BANNING, JR., OF WILMETTE, ILLINOIS.

FUEL FEEDING AND METERING SYSTEM AND APPARATUS.

Application filed July 25, 1924. Serial No. 728,209.

This invention has to do with certain improvements in fuel feeding and metering systems and apparatus. The invention has reference particularly to improvements in systems and apparatus for feeding and metering the fuel delivered to internal combustion engines, but it will presently appear that the features of the present invention are not limited to this particular class of service, but may also be used to advantage for other purposes. However, since the features of the present invention have been devised with particular reference to the conditions and requirements existing in the operation of internal combustion engines, and particularly those used for automotive vehicles, I have illustrated and will describe the invention for this particular service, but in so doing, it will be understood that I do not intend to limit myself except as I may do so in the claims.

One of the objects of the present invention is to provide a system and apparatus for feeding the fuel, and in some cases for also metering it, which shall be operable by the use of any suitable power, or power derived from any suitable source. For example, the device of the present invention may be operated either by the pressure or velocity of gases naturally existing in the exhaust manifold of the engine; or by the suction naturally existing in the intake manifold of the engine; or by the use of a small electric motor; or by the use of compressed air derived from any suitable source, or in any other convenient manner. In other words, the operation of the fuel feeding device is flexible to the extent that this feature of the invention can be used with a large number of different sources of power and under many different conditions of operation.

Another feature of the invention relates to the provision of an arrangement whereby the fuel delivered by the apparatus may be delivered to the carburetor or other engine feeding mechanism either by gravity or under pressure, thus adapting the use of the apparatus to engine feeding devices of widely varying characteristics. In connection with this object it is a further object to so arrange the mechanism that it can be used with either gravity or pressure feed without any change in its construction and mode of operation, and merely by attaching the delivery pipe to either of two connections.

A further object of the invention is to make provision for metering the fuel, so that a record of the total amount of fuel supplied shall be available. In this connection, a further object is to so construct the apparatus itself that it will naturally and easily lend itself to use as a metering device, so that both the fuel supplying and metering features can be obtained without change in the apparatus itself.

In connection with the foregoing, it is a further object to so arrange the apparatus that it will be extremely accurate in its measurements and will give a very accurate summation of the total volume of fuel delivered through it, whether the rate of feed be fast or slow, and whether the pressure of delivering be higher or lower. In this connection a still further object is to provide a very simple arrangement for adjusting the apparatus so as to calibrate it from time to time, if necesasry, so that its accuracy of measurement may be initially established, and so that such accuracy may be maintained after long service.

In connection with the foregoing, a further object is to provide a metering arrangement such that the device itself can be used in connection with other metering instruments, and such that when so used the fuel supplying and metering device can be properly calibrated with respect to the other device or instrument with which it may be used, so that the two will operate in proper harmony.

A further object of the invention is to provide an apparatus in which the calibrating or adjusting elements are located within their own compartment or chamber and completely isolated from the fuel compartments or chambers, so that the adjustments and calibrations may be made without disturbing the fuel feeding mechanisms and while the apparatus is in operation, and without loss of fuel or danger of leakage.

A further object of the invention is to provide an apparatus embodying all of the foregoing characteristics, and which is so designed and constructed that a substantial amount of power will be delivered for metering apparatus without an interference with proper delivery of the fuel to the engine, so that the present apparatus may be used for operating metering or other instruments or devices requiring a substantial amount of power for their operation, but without detriment to the operation of the present apparatus for the purpose of feeding fuel. It is a further object to make provision for securing this result when delivering the fuel to the engine either by gravity or under pressure.

Other objects are to provide an apparatus of simple form and construction, one which shall be reliable and durable in service, and one which can be cheaply manufactured and readily assembled.

Other objects and uses of the invention will appear from a detailed description of the same, which consists in the features of construction and combinations of parts hereinafter described and claimed.

In the drawings:

Figure 1 shows a vertical section through one form of fuel supplying and metering apparatus embodying the features of the present invention. The form of apparatus shown in Fig. 1 makes use of sylphons or other sealed chambers for generating power used for operation of the device;

Fig. 2 shows a cross section taken on the line 2—2 of Fig. 1, looking in the direction of the arrows;

Fig. 3 shows a cross section taken on the line 3—3 of Fig. 1, looking in the direction of the arrows;

Fig. 4 shows a fragmentary detail view through a modified form of pumping element which is also in the nature of a sylphon;

Fig. 5 shows a cross section taken on the line 5—5 of Fig. 1, looking in the direction of the arrows;

Fig. 6 shows a cross section taken on the line 6—6 of Fig. 1, looking in the direction of the arrows;

Fig. 7 shows a cross section taken on the line 7—7 of Fig. 1, looking in the direction of the arrows;

Fig. 8 shows a detailed section taken on the line 8—8 of Fig. 1, looking in the direction of the arrows;

Fig. 9 shows a fragmentary detailed view taken on the line 9—9 of Fig. 1, looking in the direction of the arrows;

Fig. 10 shows a fragmentary vertical view partly in section of a modified arrangement in which the power for operating the device is provided by the use of a fan or turbine;

Fig. 11 is a fragmentary section taken on the line 11—11 of Fig. 10, looking in the direction of the arrows;

Fig. 12 shows diagrammatically the manner in which the apparatus can be operated from the exhaust side of the engine, the arrangement being such as to make possible the use of the dynamic or velocity pressure of the exhaust gas at the instant it is delivered through the exhaust port;

Fig. 13 shows a fragmentary section taken on the line 13—13 of Fig. 12, looking in the direction of the arrows; and Fig. 14 shows diagrammatically another set of connections for making it possible to use the apparatus of the present invention by the use of the suction existing in the intake manifold of the engine.

In both Figs. 12 and 14 the present apparatus is shown as being connected to a suitable indicating device on the dash board of the vehicle for indicating the amount of fuel consumed at a point convenient for observation by the driver.

The particular construction illustrated in the drawings includes a tilting plate or element 20, which, for purposes of convenience, is mounted upon a ball and socket joint, so that it can easily tilt in any direction about a fixed point as a center. This ball and socket joint includes a ball member 21 on the upper end of a stem 22; and the tilting plate is split horizontally at a plane which extends through the tilting center, so that the tilting plate can be readily set onto or removed from the ball 21 by manipulation of the cap piece 23. This cap piece carries a vertically extending stem 24 which always lies at right angles, or another fixed angle with respect to the tilting plate.

The tilting plate carries one or more arms to which are connected suitable pumping devices, so that by proper tilting of the plate, these pumping devices are operated. In the arrangement illustrated, the tilting plate carries the three arms 25, 26 and 27 located at 120° with respect to each other. With this arrangement a movement of the arm 24 in circular fashion around a vertical axis will cause the arms 25, 26 and 27 to rise and fall in succession and in a more or less direct vertical fashion.

Each of the arms 25, 26 and 27 operates a pumping element. In the arrangement illustrated in Fig. 1, these pumping elements take the form of plungers 28, 29, and 30 on the lower end of the vertical stems 31, 32 and 33. These plungers in turn work within cylinders of a base block 34, whose form is well illustrated in Figs. 1, 3 and 5.

The base block 34 is provided with a more or less annular inlet passage 35 into which the fuel is initially delivered by an inlet connection 36, whose upper end 37 draws fuel from any suitable source, such as the main supply tank at the rear end of the vehicle.

The inlet passage 35 delivers fuel to all its cylinders through the medium of check valves placed in the floors of the cylinders. These check valves are illustrated of standard construction. Each of them includes a body member 38 which can be threaded down into a suitable socket in the base member 34, a lead or fiber gasket 39 being provided if desired, for securing a perfectly tight joint. The ball 40 within the body member 38 operates over an ample bore in the bottom of the body member, and a cross wire 41 may be provided across the body member above the ball so as to limit the upper movement of the ball, and also to provide a convenient element by which the check valve can be screwed into place or removed from the base member 34. It will be observed that each of these check valves is located in direct alignment with its cylinder through which it can be readily introduced or removed or adjusted.

Leading sidewise from each of the cylinders is a discharge passage 42 above which is placed a discharge check valve of form and construction similar to those already explained. Above the discharge check valves is located a relatively small central discharge chamber 43 into which the fuel is initially delivered. A central passage 44 leads downwardly from the chamber 43 to deliver the fuel into a pressure or other chamber 45.

The chamber 45 is conveniently established by a sheet metal container 46 of sufficient size to reach upwardly past the base member 34 with a clearance sufficient to establish a surrounding chamber. This chamber in turn communicates with the space above the various plungers or other pumping elements 28, so that the pressure exerted on the top side of these plungers is substantially equal to that exerted on their lower faces. At this point, it will be explained that the arrangements are such that the pumping elements are sealed in an air tight manner, the power for operating them being supplied through the medium of flexible air tight elements, so that it is possible to cause the pumping elements themselves to operate within a sealed chamber, the power for which is derived from an outside source.

Owing to the fact that the pressure within the discharge chamber 43 is substantially the same as that above the plungers 28 on the down stroke, the only difference in pressure being that necessary to move the fuel through the discharge check valve, it follows that the tendency of the fuel to leak upwardly past the plungers is reduced to a minimum. This will make it unnecessary to use the same degree of accuracy in machine work and construction which would otherwise be needed, and at the same time will increase the accuracy of the operation of the device for metering purposes, since the displacement of fuel per stroke will be more accurately known.

With the balanced pressure arrangement as above disclosed, the major portion of the work necessary to place the fuel under pressure is performed on the up or suction stroke of the plungers. In order to completely eliminate any seepage of air past the plungers on the up or suction stroke, and also in order to effectively lubricate them and reduce the wear to a minimum, I prefer to place a bath of oil on the top sides of the plungers, which oil will travel up and down with the plungers, effectively lubricating the cylinder walls, and establishing a perfect air seal. This oil may be sufficient in amount to fill the lower portion of the chamber immediately above the plungers, resting upon the floor of such chamber and the top sides of the plungers, and moving up and down with the plungers during their displacement. The oil just referred to may be of any suitable composition, but is preferably substantially non-soluble in the liquid being pumped. Where the device is used for pumping such liquids as gasoline, etc., castor oil will be found to be a very satisfactory lubricating medium to place on top of the plunger. It is substantially non-soluble in gasoline, is a very excellent lubricant, may be procured in large quantities at a moderate cost, and is of almost universal distribution.

The stem 24 is controlled in its movements so that it travels around a definite path, such as the surface of a cone. In this case its upper end 47 travels in a horizontal circle. The radius of this circle is a measure of the stroke performed by the plungers, since increasing the circle increases the plunger stroke, whereas decreasing the circle decreases the plunger stroke. Consequently, the regulation of the size of this circle will serve to regulate the total volume of fuel displaced per revolution of the stem 24 and its upper end 47.

A shaft 48 is located above the position of the stem 24 and rotates on a vertical axis in suitable bearings. The lower end of this shaft is connected to the upper end 47 of the stem by a suitable crank arrangement, and means are provided for adjusting the throw of this crank so as to adjust the size of the circle. In the particular construction illustrated, this means takes the form of a bracket member 49 having a lower horizontal leg 50 upon which is slidably mounted a block 51 having a socket 52 which receives the ball on the upper end 47 of the stem 24. The horizontal arm 50 has a longitudinal unthreaded recess within which lies a screw 53, and the block 51 overlies the top portion of this screw to which it is threaded. The end of the screw rests against the end of the slot, and by turning the milled head 54 of the screw while holding the screw against the end of the slot will cause the block 51 to move in or out according to the manipulation. A lock block 55 is mounted on the bracket 49, being provided with a finger 56 which engages an annular recess adjacent to the milled head 54, so that upon tightening up a set screw 57, the finger 56 will jam the screw 53 against the end of the recess within which it lies. The screw is thus held against improper turning and the position of the block 51 is thus held fixed in the adjusted position for the desired throw of the stem 24 in its movement.

In connection with the foregoing it should be observed that the preferred arrangement is that in which the axis of the shaft 48 passes through the center of the ball 21 upon which the tilting plate is mounted.

The tilting plate and the travel of the stem 24 are harmonious and interdependent. The power for causing these movements may be provided by rotating the shaft 48 in the first instance, or by applying power to the tilting plate itself or to the plungers or the stems 31, 32 and 33. In the construction illustrated in Fig. 1, the power is supplied in the first instance to the stems, tending to move them up and down, and this is done in proper sequence and harmony to cause the stem 24 to travel in the proper manner, and drive the shaft 48. The arrangement illustrated in Fig. 1 includes a bellows or sylphon connected to each plunger stem. These bellows are subjected in proper sequence to either pressure or suction and when this is done suitable valve mechanism is provided for controlling this application of power. These are the bellows 58, 59 and 60 (59 not appearing in Fig. 1). Each has its lower movable end 61 connected to its plunger and its upper end 62 held stationary. For this purpose a horizontal partition 63 is provided to which the upper portion of each bellows is connected. The bellows itself constitutes a circular chamber of flexible substantially air tight material such as soft leather. The lower end of this cylindrical member is effectively clamped in air tight manner between the upper and lower plates on the upper end of the plunger, and the upper portion of the chamber is clamped in air tight manner between the flange 64 of a hollow stem 65 and a washer which is threaded upon said stem. The hollow stem 65 passes up through the stationary partition 63, and if desired, a washer 66 may be provided for sealing this connection in an air tight manner.

Mounted upon the shaft 48 is a valve member 67 which rotates within a stationary chamber 68. This valve member 67 is provided in its upper portion with a circular recess 69 which communicates at all times with a nipple 70 in the wall of the chamber 68, so that either suction or pressure supplied to said nipple 70 by a tube 71 will be at all times communicated directly to the recess 69. The valve member 67 is also provided with a downwardly facing segmental lug 72 which travels around the floor of the chamber 68. This lug 72 has a central arcuate passage 73 which receives either pressure or suction from the annular recess 69 by reason of a vertical passage 73 in the valve member.

The floor of the chamber 68 is provided with three ports 75, 76 and 77 corresponding to the three bellows previously mentioned, and these ports communicate with outwardly reaching hollow arms 78, 79 and 80. Each hollow arm in turn communicates with the appropriate bellows or sylphon by a tube 81 of rubber or other suitable material.

The lower portion of the casing 68 is provided with an opening 82 communicating with the atmosphere, and the central lower portion 83 of the valve member 67 is smaller in size than the projection 72 within which is located the annular passage 73. Consequently, as the valve rotates, each port is placed successively in communication with either pressure or suction existing in the tube 71, and with the atmosphere, so that the bellows are alternately subjected to either pressure or suction as the case may be, and to atmospheric pressure.

The lug 72 and its passage 73 are of sufficient arcuate span to insure an overlap of ports, so that the passage 73 is always in communication with at least one of the bellows, and for a short interval at the time of each overlap with two of them. Consequently, there is no position of dead center and the operation of the device will commence at any point upon the application of either suction or pressure, and provided that the resistance offered by the plungers does not stall the machine.

In the construction of Fig. 1, the rotation of the valve and of the shaft 48 are occasioned by the power supplied through the sylphons or bellows. The position of the valve should be properly timed with respect to the stem 24 in order to secure the proper sequence of movements. Furthermore, with this arrangement the amount of pressure which will be built up in the fuel delivered from the cylinders will depend upon the pressure or suction delivered to the sylphons and their area as compared to the plunger areas. In the arrangement illustrated, the sylphons and plungers are of substantially equal area, so that the pressure of the delivered fuel in pounds per square inch will approximate either the pressure or suction in pounds per square inch delivered through the tube 71, disregarding frictional losses.

Assuming that the fuel on the delivery side is substantially at atmospheric pressure, the sylphons and plungers will commence to operate upon the application of pressure or suction to the tube 71, and they will continue to operate in proper sequence so as to pump fuel into the chamber 45, until the pressure therein becomes sufficient to stall the device by practically balancing the plunger pressures against the force exerted by the sylphons. The operation of the device will then cease until a differential of conditions takes place either by lowering of the pressure on the discharge side of the fuel or by increasing the suction or pressure on the tube 71. Thereupon the operation will automatically recommence and will continue as long as such a differential exists. Ordinarily the operation will be substantially constant in the case of an engine running at practically constant fuel demand and speed, the speed of operation depending upon the rate of fuel consumption.

In the construction shown in Fig. 1, it was explained that the chamber 45 communicates with the space above the various plungers or other pumping elements 28, which space is closed in an air tight manner. This air tight condition is accomplished by a flexible diaphragm 84 of soft leather or other suitable substantially air tight material, whose lower portion is clamped to the top block 23 of the tilting plate, and whose upper portion is clamped to the horizontal partition 63. The space 85 within which is located the tilting plate, plunger stems, and sylphons, is defined by an intermediate partition 86, but the upper portion of said space 85 communicates with the fuel discharge chamber 45 by an opening 87 in the wall of said partition 86. This opening is preferably placed as high up as possible in the partition 86, so that the elevation of the fuel in the chamber 45 may continue to rise and thereby compress the air within the chamber 85, which compression will be sufficient to balance the discharged fuel pressure under all ordinary conditions of operation before the elevation of the fuel reaches the opening 87. Consequently, under all ordinary conditions of operation the fuel on the discharge side will rise and fall in the chamber 45 without spilling over into the sealed chamber 85, but always maintaining said chamber under a pressure equal to that of the discharged fuel itself.

In order to permit of a maximum amount of compression of air within the chamber 85 before any possible spilling of fuel thereinto, I prefer to make the volume of said chamber as small as possible compared to the volume of the discharge fuel chamber, while at the same time making proper provision for the operation of the tilting plate, sylphons, etc. This result I have secured by forming the partition 86 of substantially triangular shape as shown in Fig. 2, so that all space which is not needed within the chamber 85 is transferred to the fuel discharge chamber on the other side of the partition.

In order to maintain the flexibility and durability of the leather or other material from which the sylphons are made, I have illustrated a construction which makes it possible to fill the same with a suitable oil, which oil will be transferred back and forth as the sylphons are successively contracted or expanded. For this purpose, I have illustrated a chamber 88 on the upper end of each of the stems 65, the corresponding tube 81 being connected to the top side of such chamber 88. The volume of each chamber is substantially equal to that of the corresponding sylphon, so that by placing a sufficient amount of oil in the sylphon to completely fill it, this oil can transfer back into the chamber 88 and be accommodated therein as the sylphon contracts.

It will also be observed in connection with the foregoing that the sylphon itself is at no time subjected directly to the action of the air or gas which delivers power, so that in the case of operation directly off the exhaust side of an internal combustion engine, the gases will at no time come into direct contact with the material of which the sylphons are made.

It will also be evident that oil may be placed in the pocket formed by the upper side of the diaphragm 84 so as to fill the same and thus retain this diaphragm in flexible and air tight condition.

The chamber 85 is intended to operate in an air tight manner, but I have provided a hole in the partition 63 which is normally closed by a plug 89, which when removed, permits the insertion of oil into the chamber 85 so as to provide for the operation of the plungers under oil seal in the manner already explained. When the elevation of this oil is made sufficient in the chamber 85, it will reach up to the ball and socket joint 21 so as to lubricate the same. However, I have illustrated the upper portion of the ball 21 as being cut away to establish a pocket 91 which may be initially filled with lubricant in order to insure proper lubrication regardless of the presence of oil in the chamber 85.

The connection from each of the fingers 25, 26 and 27 of the tilting plate to the corresponding plunger stem may be made in any convenient manner, bearing in mind the changes of angularity which take place in operation. In Fig. 9 I have shown in detail a simple connection which includes a slot 91 in the stem, said slot being of sufficient width to accommodate the back and forth movements of the stems. The top and bottom faces of these slots may be curved, as shown in Fig. 1, so that the stems make proper engagement at all times by a rolling action.

The check valves for the intake sides of the cylinders are seated directly on the floors of the chambers and are readily accessible after removing the plungers. The check valves on the discharge sides are located in the floor of the chamber 43 into which the fuel is initially delivered. The roof of this chamber is established by a plate 92 within which is secured the stem 22 on which the ball 21 is located, so that by removing this plate 92, all of the discharge check valves are made immediately accessible.

If desired, a guide pin 93 may be provided on the upper end of each of the stems 31, 32 and 33, said guide pin working through the passage of the nipple 65 and being of sufficiently small size not to interfere with a free movement of oil back and forth. A guide flange 94 serves to center the pin 93 in the nipple.

It is now evident that the pumping mechanism is contained within an air tight chamber and that the operation of this mechanism is accomplished or controlled from without said chamber. The valve mechanism and the adjustable connection to the upper end of the stem 24 are all contained within a chamber 95 located above the partition 63, and which chamber 95 is conveniently accessible through a number of large openings 96, 97, 98 and 99 in its wall. These openings can either be left uncovered or can be protected by means of an encircling flexible metal band 100. Such band when used may be secured in place by means of a thumb screw 101 or in any other suitable manner. By placing a lock on the band it may be locked under key so as to prevent unauthorized persons from tampering with or changing the adjustment of the mechanisms including the thumb screw 54 by means of which the apparatus is calibrated. This may be desirable when using the apparatus on certain classes of vehicle.

When the apparatus is to be used for metering purposes, the shaft 48 may be connected to any suitable measuring device such as a counting mechanism located on the instrument itself or on the dash board of the vehicle. For this purpose, I have indicated a counting device 102 located in the roof 103 of the instrument and visible through a window 104, the shaft 48 reaching directly into this counting device. Said counting device may be calibrated to read in gallons or quarts or other suitable quantities.

If desired, another shaft 105 may be geared to the shaft 48 by the bevel gears 106, a flexible shaft being connected to the projecting end of the shaft 105 and serving to transmit rotation to the instrument located at a distant point, for example on the dash board of the vehicle.

As a matter of convenience, the counting devices and related parts are shown as being placed within a chamber 107 which is located above the chamber 95 and isolated therefrom. Furthermore, as a matter of convenience, the walls of the chambers 95 and 107 may be formed by extensions of the partition 86 which establishes the chamber 85. In such case, the partition 63 should be connected to the partition 86 in an air tight manner, and also the container 46 should have its upper end connected to the partition 86 in air tight manner. The lower portion of the partition 86 should be connected to the base member 34 in a manner to prevent an interchange of fuel, and preferably air tight. All of these air tight connections may be formed by brazing or soldering or in any convenient manner.

For purposes of convenience, I have indicated a band 108 reaching around the central portion of the apparatus between the beads 109 and 110, said band providing a convenient means for supporting the apparatus on the vehicle.

A spring 111 is illustrated as pressing against the upper portion of the valve 67 in order to retain the lug 72 thereof in firm contact with the floor of the chamber 68 within which the valve is mounted so as to ensure a tight connection of the passage 74 with the ports in succession. When the device is operating under pressure instead of suction, this spring 111 should be strong enough to resist the up thrusts thus created.

It will be observed that the fuel in the chamber 45 is under pressure. The fuel may be delivered under this pressure directly to the carburetor or other fuel consuming device, for which purpose I have illustrated a nipple 112 connected into the lower portion of the chamber 45. In some cases it may be desirable to deliver the fuel under atmospheric pressure and by gravity alone. In such case, I have illustrated a chamber 113 located to the side of the chamber 45 and connected therewith by a port 114 which is under control of a valve 115 operated by a float 116. A nipple 117 provides for delivery of fuel from the chamber 113. As fast as the fuel is drawn from said chamber it will be allowed to enter the chamber through the port 114, but the pressure will be reduced at this point.

In Fig. 4 I have shown in fragmentary form a modified arrangement in which the lower portion of the stem is connected to a flexible diaphragm 118 of material impervious to the passage of fuel, which diaphragm is connected to the base member 34 in tight fashion. In this case there can be no leakage of fuel past the diaphragm, and in such case it might not be desirable to place the chamber 85 under balanced pressure.

In the modified form shown in Figs. 10 and 11, the operation of the tilting plate is accomplished by power coming from an extraneous source, and by driving the shaft 48 from outside power. When the shaft is so driven the upper end of the stem 24 will be carried around to cause it to travel on the surface of a cone, and the amount of throw of the tilting plate and plungers can be regulated by adjustment of the thumb screw 54 in a manner similar to that already explained. In the case of the present modification, however, the use of sylphons or bellows 58 is unnecessary, and also the valve mechanism may be eliminated.

The driving of the shaft 48 may be accomplished in any convenient manner, as for example, by a small electric motor, or by a connection from any suitable part of the engine or vehicle, or in any other manner desired. The arrangement should preferably be one which will allow the shaft 48 to go to rest when the pressure on the discharge side of the pumping mechanism reaches a determined amount, or else should be such that a slippage may take place at such time.

In the particular arrangement shown in Figs. 10 and 11, I have placed a worm gear 119 on the shaft 48, driving the same by a worm 120 on a shaft 121. The shaft 121 carries a small fan or minute turbine 122 having the vanes 123 on its periphery. A nozzle 124 is adapted to discharge gas under high velocity against the vanes so as to cause the shaft 121 to tend to rotate. The gas for operating this device may be derived from any suitable source, as for example, the exhaust of the engine itself.

This metering device may be conveniently used in many different ways and many different sources of power may be used for driving it. As a matter of convenience, in Figs. 12, 13, and 14 I have shown diagrammatically two particular methods by which it may be operated. In Figs. 12 and 13 I have illustrated a pipe 125 leading from the exhaust side of the engine to the metering device itself and serving to operate the same. For purposes of convenience I have illustrated a small reservoir 126 in the pipe 125, and also a check valve 127 in the pipe 125. This check valve permits gas under pressure to enter the reservoir 126, but prevents any back flow. This will make it possible to take advantage of temporary increases of pressure on the exhaust side of the engine and make use of them at a later time.

In some cases the static pressure existing in the exhaust manifold 128 will be so low that an undesirably large volume of gas should be used in order to operate the apparatus. I have, therefore, illustrated a nozzle 129 on the inner end of the pipe 125 and placed at a point where it will be directly subjected to the dynamic impulses of the gas discharged through the port 130 when the exhaust valve 131 is raised. This arrangement will make it possible to secure a greatly increased pressure in the pipe 125 when desired. Since the dynamic pressure exerted on the turbine will increase with increase of exhaust gas pressure and flow to the turbine it follows that the rotative force of the turbine will increase with the rate of engine consumption of fuel by the engine. The pressure created by the fuel pump will depend on the rotative force of the turbine so it follows that the fuel pressure created by the pump will actually increase as the rate of fuel consumption increases. This will be a desirable result of operation of the fuel supply system.

In the arrangement shown in Fig. 14, I have indicated a pipe 132 connecting the apparatus with the intake manifold 133 of the engine so as to operate by the suction existing in the intake manifold. It should be observed that where the operation is performed by the use of a series of sylphons or the like the rotation of the shaft 48 will be in one direction when operated by suction, and in the other direction when operated by pressure. Consequently, the counting device should be adapted and designed with a view to the correct direction of rotation of the shaft 48.

In each of the arrangements shown diagrammatically in Figs. 12, 13 and 14, I have shown a pipe 134 for delivering fuel to the apparatus from the main supply tank 135, and another pipe 136 for delivering the fuel to the carburetor or other apparatus 137. I have also in each case indicated the counting device 101 on the top of the apparatus, and have also indicated another counting device 138 on the dash board 139 of the vehicle connected thereto by a flexible shaft 140.

It is to be observed that in those cases in which the balancing of pressure on the two sides of the plungers 28, 29 and 30 is accomplished by placing the air within the chamber 85 under compression equal to the fuel pressure in the chamber 45, there may be a slight lag in the operation of the plungers as compared to the demand for fuel from the device. In some cases it may be of advantage to have the operation of the plungers, and particularly the rotary operation of the stem 24 and shaft 48 respond immediately to the demand for fuel. This might be true, for example, in the case of the use of the apparatus of the present invention in connection with an instrument which serves to differentiate between rate of fuel consumption and rate of travel of a vehicle.

By allowing the chamber 85 to be completely filled with fuel instead of air, a balancing of pressures on the plungers will be secured, and at the same time the immediate response of plunger movement will also occur upon drawing fuel from the chamber 45. When the chamber 45 is connected to the carburetor or fuel user direct as by the use of the nipple 112, the present apparatus will immediately respond in operation to instantaneous changes in the fuel consumption.

In those cases in which it may not be desirable to allow fuel to enter the chamber 85, but in which nevertheless it is desired to secure this immediate response, the passage 87 may be closed in order to completely isolate the chambers 45 and 85 from each other, or a supplemental partition, such as shown by the dotted lines 141, may be placed within the apparatus so as to cut off the chamber 45 and to permit it to operate completely filled with fuel at all times.

I do not herein claim the method of operation of pumping devices embodied in the present invention, since claims covering said method will be included in a divisional application for Letters Patent of the United States.

While I have herein referred to the driving of the pumping and metering device by an electric motor or the like, operating upon the shaft 48 or an equivalent shaft, still I do not specifically claim this arrangement in the present application, since certain of the claims in this case are specific to the operation of this device by the use of sylphons, etc., into which the suction or pressure is admitted. For this and other reasons I am claiming the motor drive in a divisional application for Letters Patent of the United States.

It will be noted that in Fig. 4 I have illustrated an alternative form of displacement cylinder in which use is made of a corrugated or seamed wall 118 secured at one end to a movable part and at the other end to a fixed wall or part, so that the displacement action occurs by the flexing of this wall 118. In this way the use of pistons sliding in cylinders is avoided, and furthermore there is no possibility of leakage of the liquid being displaced even at very slow rates of pumping. I do not specifically claim this type of construction in this case since the same is shown and claimed in a divisional application for Letters Patent filed by me in the United States Patent Office.

While I have herein referred to an arrangement for driving the shaft 48 in such a way that when the pressure on the discharge side of the pumping mechanism reaches a predetermined amount slippage may take place at such time, so as to allow said shaft to go to rest, still I do not specifically claim such an arrangement herein, as the same constitutes the subject-matter of a divisional application for Letters Patent of the United States.

While I have herein shown and described only certain embodiments of the features of my present invention, still I do not limit myself to the same, except as I may do so in the claims.

I claim:

1. Liquid metering apparatus comprising in combination three vertical cylinders located at the corners of an equi-lateral triangle, a vertically movable plunger within each cylinder, a stem reaching upwards from each plunger, a centrally placed rocker plate between the stems, a central ball and socket support therefor, a connection from the plate to each plunger stem, a common inlet chamber beneath all of the cylinders, an inlet check valve in the floor of each cylinder communicating with the inlet chamber, a discharge chamber beneath the inlet chamber, an outlet check valve controlling communication from each cylinder to the discharge chamber, a central upwardly reaching rocker stem on the rocker plate, a horizontal partition above the rocker plate and having a central opening through which the rocker stem reaches, a flexible gas tight diaphragm between the edge of the perforation and the central portion of the rocker plate around the rocker stem, a collapsible chamber between the partition and each plunger stem, a surge chamber above the partition corresponding to each collapsible chamber and communicating therewith, a partition enclosing the discharge chamber aforesaid and cooperating with the first mentioned partition to establish a gas tight chamber including the space around the rocker plate and around the collapsible chambers and the space above the top sides of the plungers, a partition between the rocker plate together with the plunger stems and collapsible chambers, and the discharge chamber preventing communication except at the upper end of said partition, a rotary valve, a ball and socket crank connection between the rocker stem and said valve, means for adjusting the throw of said crank connection, a motive power connection to said valve, connections from said valve to the surge chambers aforesaid, ports in the valve serving to establish alternative connection between each surge chamber and the motive power connection and atmosphere, in timed succession with respect to the movements of the plungers, suitable liquid in each collapsible cylinder and its surge chamber, and suitable oil on the top sides of the plungers and around the ball and socket joint aforesaid, substantially as described.

2. Liquid metering apparatus comprising in combination a plurality of vertical cylinders located equidistant around a common center, a vertically movable plunger within each cylinder, a stem reaching upwards from each plunger, a centrally placed rocker plate between the stems, a central ball and socket support therefor, a connection from the plate to each plunger stem, a common inlet chamber adjacent to all of the cylinders, an inlet check valve in the floor of each cylinder communicating with the inlet chamber, a discharge chamber, an outlet check valve controlling communication from each cylinder to the discharge chamber, a central upwardly reaching rocker stem on the rocker plate, a horizontal partition above the rocker plate and having a central opening through which the rocker stem reaches, a flexible gas tight diaphragm between the perforation and the rocker plate around the rocker stem, a collapsible chamber between the partition and each plunger stem, a surge chamber corresponding to each collapsible chamber and communicating therewith, a partition enclosing the discharge chamber aforesaid and co-operating with the first mentioned partition to establish a gas tight chamber including the space around the rocker plate and around the collapsible chambers and the space above the top sides of the plungers, a partition between the rocker plate together with the plunger stems and collapsible chambers, and the discharge chamber preventing communication except at the upper end of said partition, a rotary valve, a ball and socket crank connection between the rocker stem and said valve, means for adjusting the throw of said crank connection, a motive power connection to said valve, connections from said valve to the surge chambers aforesaid, ports in the valve serving to establish alternative connection between each surge chamber and the motive power connection and atmosphere, in timed succession with respect to the movements of the plungers, suitable liquid in each collapsible cylinder and its surge chamber, and suitable oil on the top sides of the plungers and around the ball and socket joint aforesaid, substantially as described.

3. Liquid metering apparatus comprising in combination a plurality of vertical cylinders located equidistant around a common center, a vertically movable plunger within each cylinder, a stem reaching upwards from each plunger, a centrally placed rocker plate between the stems, a central ball and socket support therefor, a connection from the plate to each plunger stem, a common inlet chamber adjacent to all of the cylinders, an inlet check valve in the floor of each cylinder communicating with the inlet chamber, a discharge chamber, an outlet check valve controlling communication from each cylinder to the discharge chamber, a central upwardly reaching rocker stem on the rocker plate, a horizontal partition above the rocker plate and having a central opening through which the rocker stem reaches, a flexible gas tight diaphragm between the perforation and the rocker plate around the rocker stem, a collapsible chamber between the partition and each plunger stem, a surge chamber corresponding to each collapsible chamber and communicating therewith, a partition enclosing the discharge chamber aforesaid and co-operating with the first mentioned partition to establish a gas tight chamber including the space around the rocker plate and around the collapsible chambers and the space above the top sides of the plungers, a partition between the rocker plate together with the plunger stems and collapsible chambers, and the discharge chamber preventing communication except at the upper end of said partition, a rotary valve, a ball and socket crank connection between the rocker stem and said valve, a motive power connection to said valve, connections from said valve to the surge chambers aforesaid, ports in the valve serving to establish alternative connection between each surge chamber and the motive power connection and atmosphere, in timed succession with respect to the movements of the plunger, suitable liquid in each collapsible cylinder and its surge chamber, and suitable oil on the top sides of the plungers and around the ball and socket joint aforesaid, substantially as described.

4. Liquid metering apparatus comprising in combination a plurality of vertical cylinders located equidistant around a common center, a vertically movable plunger within each cylinder, a stem reaching upwards from each plunger, a centrally placed rocker plate between the stems, a central ball and socket support therefor, a connection from the plate to each plunger stem, a common inlet chamber adjacent to all of the cylinders, an inlet check valve in the floor of each cylinder communicating with the inlet chamber, a discharge chamber, an outlet check valve controlling communication from each cylinder to the discharge chamber, a central upwardly reaching rocker stem on the rocker plate, a horizontal partition above the rocker plate and having a central opening through which the rocker stem reaches, a flexible gas tight diaphragm between the partition and the rocker plate around the rocker stem, a collapsible chamber between the partition and each plunger stem, a surge chamber corresponding to each collapsible chamber and communicating therewith, a partition enclosing the discharge chamber aforesaid and co-operating with the first mentioned partition to establish a gas tight chamber including the space around the rocker plate and around the collapsible chambers and the space above the top sides of the plungers, a partition between the rocker plate together with the plunger stems and collapsible chambers, and the discharge chamber preventing communication except at the upper end of said partition, a rotary valve, a ball and socket crank connection between the rocker stem and said valve, a motive power connection to said valve, and connections from said valve to the surge chambers aforesaid, there being ports in the valve serving to establish alternative connection between each surge chamber and the motive power connection and atmosphere, in timed succession with respect to the movements of the plungers, substantially as described.

5. Liquid metering apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, a common inlet chamber adjacent to all of the cylinders, an inlet check valve in the floor of each cylinder communicating with the inlet chamber, a discharge chamber, an outlet check valve controlling communication from each cylinder to the discharge chamber, a central upwardly reaching rocker stem on the rocker plate, a partition above the rocker plate and having a central opening through which the rocker stem reaches, a flexible gas tight diaphragm between the partition and the rocker plate around the rocker stem, a collapsible chamber between the partition and each plunger stem, a surge chamber corresponding to each collapsible chamber and communicating therewith, a partition enclosing the discharge chamber aforesaid and co-operating with the first mentioned partition to establish a gas tight chamber including the space around the rocker plate and around the collapsible chambers and the space above the top sides of the plungers, a rotary valve, a ball and socket crank connection between the rocker stem and said valve, a motive power connection to said valve, and connections from said valve to the surge chambers aforesaid, there being ports in the valve serving to establish alternative connection between each surge chamber and the motive power connection and atmosphere, in timed succession with respect to the movements of the plungers, substantially as described.

6. Liquid metering apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, a common inlet chamber adjacent to all of the cylinders, an inlet check valve communicating with the inlet chamber, a discharge chamber, an outlet check valve controlling communication from each cylinder to the discharge chamber, a central upwardly reaching rocker stem on the rocker plate, a partition above the rocker plate and having a central opening through which the rocker stem reaches, a flexible gas tight diaphragm between the partition and the rocker plate around the rocker stem, a collapsible chamber between the partition and each plunger stem, a surge chamber corresponding to each collapsible chamber and communicating therewith, a partition enclosing the discharge chamber aforesaid and co-operating with the first mentioned partition to establish a gas tight chamber including the space around the rocker plate and around the collapsible chambers and the space above the top sides of the plungers, a rotary valve, a ball and socket crank connection between the rocker stem and said valve, a motive power connection to said valve, and connections from said valve to the surge chambers aforesaid, there being ports in the valve serving to establish alternative connection between each surge chamber and the motive power connection and atmosphere, in timed succession with respect to the movements of the plungers, substantially as described.

7. Liquid metering apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, a common inlet chamber adjacent to all of the cylinders, an inlet check valve communicating with the inlet chamber, a discharge chamber, an outlet check valve controlling communication from each cylinder to the discharge chamber, a central upwardly reaching rocker stem on the rocker plate, a partition above the rocker plate and having a central opening through which the rocker stem reaches, a flexible gas tight diaphragm between the partition and the rocker plate around the rocker stem, a collapsible chamber between the partition and each plunger stem, a partition enclosing the discharge chamber aforesaid and co-operating with the first mentioned partition to establish a gas tight chamber including the space around the rocker plate and around the collapsible chambers and the space above the top sides of the plungers, a rotary valve, a ball and socket crank connection between the rocker stem and said valve, a motive power connection to said valve, and connections from said valve to the collapsible chambers aforesaid, there being ports in the valve serving to establish alternative connection between each collapsible chamber and the motive power connection and atmosphere, in timed succession with respect to the movements of the plungers, substantially as described.

8. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, a common inlet chamber adjacent to all of the cylinders, an inlet check valve communicating with the inlet chamber, a discharge chamber, an outlet check valve controlling communication from each cylinder to the discharge chamber, a central upwardly reaching rocker stem on the rocker plate, a partition above the rocker plate and having a central opening through which the rocker stem reaches, a flexible gas tight diaphragm between the partition and the rocker plate around the rocker stem, a collapsible chamber between the partition and each plunger stem, a partition enclosing the discharge chamber aforesaid and co-operating with the first mentioned partition to establish a gas tight chamber including the space around the rocker plate and around the collapsible chambers and the space above the sides of the plungers, a rotary valve, a ball and socket crank connection between the rocker stem and said valve, a motive power connection to said valve, connections from said valve to the collapsible chambers aforesaid, and ports in the valve serving to establish alternative connection between each collapsible chamber and the motive power connection and atmosphere, in timed succession with respect to the movements of the plungers, substantially as described.

9. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, a common inlet chamber adjacent to all of the cylinders, an inlet check valve communicating with the inlet chamber, a discharge chamber, an outlet check valve controlling communication from each cylinder to the discharge chamber, a central upwardly reaching rocker stem on the rocker plate, a collapsible chamber above each plunger stem, a rotary valve, a ball and socket crank connection between the rocker stem and said valve, a motive power connection to the said valve, connections from said valve to the collapsible chambers aforesaid, and ports in the valve serving to establish alternative connection between each collapsible chamber and the motive power connection and atmosphere, in timed succession with respect to the movements of the plungers, substantially as described.

10. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, inlet and outlet connections to each cylinder, a central upwardly reaching rocker stem on the rocker plate, a collapsible chamber above each plunger stem, a rotary valve, a ball and socket crank connection between the rocker stem and said valve, a motive power connection to the said valve, connections from the said valve to the collapsible chambers aforesaid, and ports in the valve serving to establish alternative connection between each collapsible chamber and the motive power connection and atmosphere in timed succession with respect to the movements of the plungers, substantially as described.

11. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, inlet and outlet connections to each cylinder, a central upwardly reaching rocker stem on the rocker plate, fluid operated means in connection with each plunger stem, a rotary valve, a ball and socket crank connection between the rocker stem and said valve, a motive power connection to the said valve, connections from said valve to the fluid operated means aforesaid, and ports in the valve serving to establish alternative connection between each fluid pressure operated means and the motive power connection and atmosphere in timed succession with respect to the movements of the plungers, substantially as described.

12. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, inlet and outlet connections to each cylinder, a central upwardly reaching rocker stem on the rocker plate, fluid pressure operated means in conjunction with each plunger stem, a valve, an operative connection from the rocker stem to the same, a motive power connection to the valve, connections from the valve to the fluid pressure operated means, and ports in the valve serving to establish alternative connection between each fluid pressure operated means and the motive power connection and atmosphere in timed succession with respect to the movements of the plungers, substantially as described.

13. Liquid flow apparatus comprising in combination a plurality of vertical cylinders located equidistant around a common center, a vertically movable plunger within each cylinder, a stem reaching upwardly from each plunger, a centrally placed rocker plate between the stems, a central pivotal support therefor, a connection from the plate to each plunger stem, inlet and discharge connections to each cylinder, a central upwardly reaching rocker stem on the rocker plate, fluid pressure operated means in conjunction with each plunger stem, a valve, an operative connection between the rocker stem and said valve including means for causing the rocker stem to move over a conical surface, means for varying the radius of the cone of said surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

14. Liquid flow apparatus comprising in combination a plurality of vertical cylinders located equidistant around a common center, a vertically movable plunger within each cylinder, a stem reaching upwards from each plunger, a centrally placed rocker plate between the stems, a central pivotal support therefor, a connection from the plate to each plunger stem, inlet and discharge connections to each cylinder, a central upwardly reaching rocker stem on the rocker plate, fluid pressure operated means in conjunction with each plunger stem, a valve, an operative connection between the rocker stem and said valve including means for causing the rocker stem to move over a conical surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

15. Liquid flow apparatus comprising in combination a plurality of vertical cylinders located around a common center, a vertically movable plunger within each cylinder, a stem reaching upwards from each plunger, a rocker plate between the stems, a pivotal support therefor, a connection from the plate to each plunger stem, inlet and discharge connections to each cylinder, a rocker stem on the rocker plate, fluid pressure operated means in conjunction with each plunger stem, a valve, an operative connection between the rocker stem and said valve including means for causing the rocker stem to move over a conical surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

16. Liquid flow apparatus comprising in combination a plurality of vertical cylinders located around a common center, a vertically movable plunger within each cylinder, a stem reaching upwards from each plunger, a rocker plate between the stems, a pivotal support therefor, a connection from the plate to each plunger stem, inlet and discharge connections to each cylinder, a rocker stem on the rocker plate, fluid pressure operated means in conjunction with each plunger stem, a valve, an operative connection between the rocker stem and said valve including means for causing the rocker stem to move over a conical surface, means for varying the radius of the cone of said surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

17. Liquid flow apparatus comprising in combination a plurality of vertical cylinders located around a common center, a vertically movable plunger within each cylinder, a stem reaching upwards from each plunger, means for causing the plungers and stems to reciprocate in continuous sequence including a rocker stem, fluid pressure operated means in conjunction with each plunger stem, a valve, an operative connection between the rocker stem and said valve including means for causing the rocker stem to move over a conical surface, means for varying the radius of the cone of said surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

18. Liquid flow apparatus comprising in combination a plurality of vertical cylinders located around a common center, a vertically movable plunger within each cylinder, a stem reaching upwards from each plunger, means for causing the plungers and stems to reciprocate in continuous sequence including a rocker stem, fluid pressure operated means in conjunction with each plunger stem, a valve, an operative connection between the rocker stem and said valve including means for causing the rocker stem to move over a conical surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

19. Liquid flow apparatus comprising in combination a plurality of vertical cylinders, a vertically movable plunger within each cylinder, a stem reaching upwards from each plunger, means for causing the plungers and stems to reciprocate in continuous sequence including a rocker stem, fluid pressure operated means in conjunction with each plunger stem, a valve, an operative connection between the rocker stem and said valve, including means for causing the rocker stem to move over a conical surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

20. Liquid flow apparatus comprising in combination a plurality of single acting vertical cylinders, inlet and outlet connections to each cylinder, a vertically movable plunger within each cylinder, a stem reaching upwards from each plunger, a rocker plate between the stems, a pivotal support therefor, a connection from the plate to each plunger stem, a rocker stem on the rocker plate, fluid pressure operated means in conjunction with each plunger stem, means for establishing a chamber sealed from the atmosphere and in communication with the free sides of the plungers and with the outlet cylinder connections, a valve, an operative connection between the rocker stem and said valve including means for causing the rocker stem to move over a conical surface, means for varying the radius of the cone of said surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

21. Liquid flow apparatus comprising in combination a plurality of single acting vertical cylinders, inlet and outlet connections to each cylinder, a vertically movable plunger within each cylinder, a stem reaching upwards from each plunger, a rocker plate between the stems, a pivotal support therefor, a connection from the plate to each plunger stem, a rocker stem on the rocker plate, fluid pressure operated means in conjunction with each plunger stem, means for establishing a chamber sealed from the atmosphere and in communication with the free sides of the plungers and with the outlet cylinder connections, a valve, an operative connection between the rocker stem and said valve, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

22. Liquid flow apparatus comprising in combination a plurality of single acting vertical cylinders, inlet and outlet connections to each cylinder, a vertically movable plunger within each cylinder, a stem reaching upwards from each plunger, means for causing the plungers and stems to reciprocate in continuous sequence including a rocker stem, fluid pressure operated means in conjunction with each plunger stem, means for establishing a chamber sealed from the atmosphere in communication with the free sides of the plunger and with the outlet cylinder connections, a valve, an operative connection between the rocker stem and said valve, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the plungers, substantially as described.

23. Liquid flow apparatus comprising in combination a plurality of single acting vertical cylinders, inlet and outlet connections to each cylinder, a vertically movable plunger within each cylinder, a stem reaching upwards from each plunger, means for causing the plungers and stems to reciprocate in continuous sequence, fluid pressure operated means in conjunction with each plunger stem, means for balancing the pressures on the free sides of the plungers with respect to the outlet pressures from the cylinders, a valve, an operative connection between the valve and the means for causing the plungers and stems to reciprocate in continuous sequence, a motive power connection to said valve, connections from said valve to the fluid pressure operated means aforesaid, and ports in the valve serving to establish alternative connections between each fluid pressure operated means and the motive power connection and atmosphere in timed succession with respect to the movements of the plungers, substantially as described.

24. Liquid flow apparatus comprising in combination a plurality of single acting vertical cylinders, inlet and outlet connections to each cylinder, a vertically movable plunger within each cylinder, a stem reaching upwards from each plunger, means for causing the plungers and stems to reciprocate in continuous sequence, fluid pressure operated means in conjunction with each plunger stem, means for balancing the pressures on the free sides of the plungers with respect to the outlet pressures from the cylinders, a valve, an operative connection between the valve and the plunger stems, a motive power connection to said valve, connections from said valve to the fluid pressure operated means aforesaid, and ports in the valve serving to establish alternate connections between each fluid pressure operated means and the motive power connection and atmosphere in timed succession with respect to the movements of the plungers, substantially as described.

25. Liquid flow apparatus comprising in combination a plurality of single acting vertical cylinders, inlet and outlet connections to each cylinder, a vertically movable plunger within each cylinder, a stem reaching upwards from each plunger, means for causing the plungers and stems to reciprocate in continuous sequence, means for balancing the pressures on the free sides of the plungers with respect to the outlet pressures of the cylinders, and suitable oil or the like on the free sides of the plungers traveling thereon within the cylinders, substantially as described.

26. Liquid flow apparatus comprising in combination a vertical single acting cylinder, inlet and outlet connections thereto, a vertically movable plunger within the cylinder, means for actuating the same by the application of outside power, means for balancing the pressure on the free side of the plunger with respect to the outlet pressure from the cylinder, and suitable oil or the like on the free side of the plunger and traveling thereon within the cylinder, substantially as described.

27. Liquid flow apparatus comprising in combination a vertical single acting cylinder, inlet and outlet connections thereto, a vertically movable plunger within the cylinder, means for actuating the same by the application of outside power, and means for balancing the pressure on the free side of the plunger with respect to the outlet pressure from the cylinder, substantially as described.

28. Liquid flow apparatus comprising in combination a plurality of cylinders, inlet and outlet connections thereto, a vertically movable plunger within each cylinder, a stem reaching upwards from each plunger, a collapsible chamber having one portion thereof secured to a stationary part and another portion to each plunger, a surge chamber in connection with each collapsible chamber, means for subjecting each surge chamber to the action of a motive power connection in sequence, and suitable oil or the like within the collapsible chambers and surge chambers and operative to oscillate between them, substantially as described.

29. Liquid flow apparatus comprising in combination a plurality of cylinders, inlet and outlet connections thereto, a vertically movable plunger within each cylinder, a stem reaching upwards from each plunger, a collapsible chamber having one portion thereof secured to a stationary part and another portion to each plunger, a non-collapsible enlargement in communication with each collapsible chamber, suitable oil or the like within the collapsible chambers and operative to oscillate between them and their respective enlargements, and means for subjecting each collapsible chamber to variation in pressure in harmony with the other collapsible chambers, substantially as described.

30. Liquid flow apparatus comprising in combination a cylinder, inlet and outlet connections thereto, a vertically movable plunger within the cylinder, a stem reaching upwards from the plunger, a collapsible chamber secured to a stationary part and to the plunger, a non-collapsible enlargement in communication with the collapsible chamber, suitable oil or the like in the collapsible chamber and operating between it and the enlargement aforesaid, and means for subjecting the interior of the collapsible chamber to variation of pressure under control, substantially as described.

31. Liquid flow apparatus comprising in combination a plurality of liquid displacement cylinders located around a common center, each having its top vertically movable for displacement purposes, a stem reaching upwards from the top of each cylinder, a centrally placed rocker plate between the stems, a central pivotal support therefor, a connection from the plate to each stem, inlet and outlet connections to each cylinder, a central upwardly reaching rocker stem on the plate, fluid pressure operated means in conjunction with each stem, a valve, an operative connection from the rocker plate to the same, a motive power connection to the valve, connections from the valve to the fluid pressure operated means, and ports in the valve serving to establish alternative connection between each fluid pressure operated means and the motive power connection and atmosphere in timed succession with respect to the movements of the stems, substantially as described.

32. Liquid flow apparatus comprising in combination a plurality of liquid displacement cylinders each having its roof vertically movable for displacement purposes, a stem reaching upwards from each cylinder roof, means for causing the stems to reciprocate in continuous sequence including a rocker stem, fluid pressure operated means in conjunction with each stem first mentioned, a valve, an operative connection between the rocker stem and the valve, including means for causing the rocker stem to move over a conical surface, a motive power connection to said valve, connections from said valve to the fluid pressure operated means aforesaid, and ports in the valve serving to establish alternative connection between each fluid pressure operated means and the motive power connection and atmosphere in timed succession with respect to the movements of the cylinder roofs, substantially as described.

33. Liquid flow apparatus comprising in combination a vertical single acting cylinder having its roof vertically movable for displacement purposes, inlet and outlet connections to the cylinder, means for actuating the cylinder roof by application of outside power, and means for balancing the pressure on the roof with respect to the outlet pressure from the cylinder, substantially as described.

34. Liquid flow apparatus comprising in combination a cylinder having one of its enclosing walls movable for displacement purposes, inlet and outlet connections to the cylinder, a stem operatively connected to the movable wall aforesaid, a collapsible chamber secured to a stationary part and to the stem aforesaid, a non-collapsible enlargement in connection with the collapsible chamber, suitable oil or the like in the collapsible chamber and operating between it and the enlargement aforesaid, and means for subjecting the interior of the collapsible chamber to variation of pressure under control, substantially as described.

35. Liquid flow apparatus comprising in combination a plurality of single acting vertical cylinders, inlet and outlet connections to each cylinder, a vertically movable plunger within each cylinder, a stem reaching upwards from each plunger, means for causing the plungers and stems to reciprocate in continuous sequence, means for balancing the pressures on the free sides of the plungers with respect to the outlet pressures of the cylinders, and castor oil or the like on the free sides of the plungers traveling thereon within the cylinders, substantially as described.

36. Liquid flow apparatus comprising in combination a vertical single acting cylinder, inlet and outlet connections thereto, a vertically movable plunger within the cylinder, means for actuating the same by the application of outside power, means for balancing the pressure on the free side of the plunger with respect to the outlet pressure from the cylinder and suitable oil or the like on the free side of the plunger and traveling thereon within the cylinder, said oil being substantially non-soluble in the liquid being pumped and having good lubricating qualities, substantially as described.

37. Liquid flow apparatus comprising in combination a plurality of cylinders, inlet and outlet connections thereto, a vertically movable plunger within each cylinder, a stem reaching upwards from each plunger, a sylphon having one portion thereof secured to a stationary part and another portion to each plunger and means for actuating the plungers in sequence, with corresponding movement of the sylphons, substantially as described.

38. Liquid flow apparatus comprising in combination a chamber, inlet and outlet connections thereto, a vertically movable plunger within the chamber, a sylphon above the plunger and having substantially the same cross sectional size as the plunger, an operative connection between the plunger and the sylphon, means for balancing the pressure on the discharge side of the cylinder with the pressure above the plunger and below the sylphon, and means for operating the plunger with corresponding movement of the sylphon, substantially as described.

39. Liquid flow apparatus comprising in combination a cylinder, inlet and outlet connections thereto, means for establishing a sealed chamber above the cylinder, a plunger working within the cylinder, said sealed chamber having a movable partition substantially the same size as the size of the plunger, an operative connection between said partition and the plunger, means for balancing the pressure in the sealed chamber with the pressure of the outlet connection, and means for operating the plunger, the partition moving in harmony therewith, substantially as described.

40. Liquid flow apparatus comprising in combination a plurality of single acting vertical cylinders, inlet and outlet connections to each cylinder, a vertically movable plunger within each cylinder, a tilting plate centrally located with respect to all of the plungers, operating connections from the tilting plate to all of the plungers, means for causing the plate to travel in a tilting movement with its axis traveling over the surface of a cone, means for adjusting the diameter of the cone and the apex angle thereof to thereby adjust the movements of the plungers, and means for establishing a sealed chamber including the space above the top sides of the plungers, substantially as described.

41. Liquid flow apparatus comprising in combination a plurality of single acting vertical cylinders, inlet and outlet connections to each cylinder, a vertically movable plunger within each cylinder, a tilting plate centrally located with respect to all of the cylinders, operative connections from the tilting plate to all of the plungers, means for causing the tilting plate to move with a tilting movement to thereby cause its axis to travel on the surface of a conical body of determined shape and size, and means for establishing a sealed chamber including the space above the plungers, and for balancing the pressure therein with the pressure in the outlet connection, substantially as described.

42. Liquid flow apparatus comprising in combination a plurality of single acting vertical cylinders, inlet and outlet connections to each cylinder, a vertically movable plunger within each cylinder, a tilting plate centrally located with respect to all of the cylinders, operative connections from the tilting plate to all of the plungers, means for causing the tilting plate to move with a tilting movement to thereby cause its axis to travel on the surface of a conical body of determined shape and size, and means for establishing a sealed chamber including the space above the plungers, substantially as described.

43. Liquid flow apparatus comprising in combination a plurality of vertical pumping chambers located equidistant about a common axis, each of said pumping chambers having a movable wall together with suitable inlet and outlet connections and valves, a tilting member located centrally with respect to all of said pumping chambers, and tiltable about a fixed centre, a stem secured to said tiltable member and intersecting said centre, means for causing said stem to travel over a conical surface, and operative connections from the tiltable member to a movable wall of each pumping chamber, together with means for adjusting the radius of the conical surface aforesaid, substantially as described.

THOMAS A. BANNING, Jr.